US012576384B2

(12) United States Patent
Crowe et al.

(10) Patent No.: US 12,576,384 B2
(45) Date of Patent: Mar. 17, 2026

(54) INTERNALLY HEATED REACTOR FOR HYDROCARBON CONVERSION

(71) Applicant: NOVA CHEMICALS (INTERNATIONAL) S.A., Fribourg (CH)

(72) Inventors: Jeffrey Crowe, Calgary (CA); Eric Clavelle, Calgary (CA); Jason Pumfrey, Newbury (CA); Vasily Simanzhenkov, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 124 days.

(21) Appl. No.: 18/282,630

(22) PCT Filed: Mar. 22, 2022

(86) PCT No.: PCT/IB2022/052602
§ 371 (c)(1),
(2) Date: Sep. 18, 2023

(87) PCT Pub. No.: WO2022/201020
PCT Pub. Date: Sep. 29, 2022

(65) Prior Publication Data
US 2024/0181421 A1      Jun. 6, 2024

Related U.S. Application Data

(60) Provisional application No. 63/166,164, filed on Mar. 25, 2021.

(51) Int. Cl.
| | |
|---|---|
| *C10G 9/36* | (2006.01) |
| *B01J 19/00* | (2006.01) |
| *B01J 19/24* | (2006.01) |

(52) U.S. Cl.
CPC ....... *B01J 19/2415* (2013.01); *B01J 19/0013* (2013.01); *C10G 9/36* (2013.01);
(Continued)

(58) Field of Classification Search
CPC ................ B01J 19/0013; B01J 19/2415; B01J 2208/00123; B01J 2208/00132;
(Continued)

(56) References Cited

U.S. PATENT DOCUMENTS

| | | | |
|---|---|---|---|
| 4,690,690 A | 9/1987 | Andrew et al. | |
| 5,321,191 A * | 6/1994 | Alagy ..................... | C10G 9/24 585/650 |

(Continued)

FOREIGN PATENT DOCUMENTS

| | | |
|---|---|---|
| GB | 1039756 | 8/1966 |
| GB | 1599398 | 9/1981 |

(Continued)

OTHER PUBLICATIONS

Ceylan et al., "The roughness effects on friction and heat transfer in the fully developed turbulent flow in pipes," Applied Thermal Engineering, Apr. 1, 2003, 23(5):557-570.

(Continued)

*Primary Examiner* — Ellen M McAvoy
*Assistant Examiner* — Chantel Graham
(74) *Attorney, Agent, or Firm* — Fish & Richardson P.C.

(57)                ABSTRACT

An apparatus for hydrocarbon conversion, the apparatus including a reactor and a reactor insert secured and disposed within an interior cavity of the reactor, is described. The reactor is configured to permit addition of a feed stream comprising a hydrocarbon at an upstream end of the reactor and to permit discharge of a product stream at a downstream end of the reactor. The reactor insert is configured to provide heat to the interior cavity to promote conversion of hydro- (Continued)

carbons as the feed stream moves from the upstream end of the reactor to the downstream end of the reactor. The products of the conversion reaction are discharged at the downstream end as part of the product stream. A method for hydrocarbon conversion using the apparatus is also described.

61 Claims, 6 Drawing Sheets

(52) U.S. Cl.
CPC ................ *B01J 2219/00081* (2013.01); *B01J 2219/0218* (2013.01); *B01J 2219/0263* (2013.01); *C10G 2300/4006* (2013.01); *C10G 2300/4012* (2013.01); *C10G 2300/805* (2013.01); *C10G 2400/20* (2013.01)

(58) Field of Classification Search
CPC .... B01J 2208/00185; B01J 2208/00238; B01J 2208/00398; B01J 2208/00415; B01J 2219/00081; B01J 2219/00092; B01J 2219/00135; B01J 2219/0218; B01J 2219/0263; B01J 6/008; C10G 2300/4006; C10G 2300/4012; C10G 2300/805; C10G 2400/02; C10G 2400/20; C10G 9/24; C10G 9/36
See application file for complete search history.

(56) References Cited

U.S. PATENT DOCUMENTS

| | | | |
|---|---|---|---|
| 6,653,005 | B1 | 11/2003 | Muradov |
| 7,018,591 | B2 | 3/2006 | Le |
| 2011/0085967 | A1 | 4/2011 | Raybold et al. |
| 2013/0247454 | A1 * | 9/2013 | Laska .................... B01J 8/0025 |
| | | | 44/457 |
| 2020/0197913 | A1 | 6/2020 | Heaton et al. |

FOREIGN PATENT DOCUMENTS

| | | | | | |
|---|---|---|---|---|---|
| GB | 1599398 | A | * | 9/1981 | ........... B01J 8/1836 |
| WO | WO 01/55027 | | | 8/2001 | |
| WO | WO-0155027 | A1 | * | 8/2001 | ........... B01J 8/0453 |

OTHER PUBLICATIONS

Lodha, Sanjay, "Unique antifouling technology for refinery key process units, fired heater and heat exchanger tubes," Heat Exchanger World, Sep. 30, 2021, pp. 1-2.

PCT International Search Report and Written Opinion in International Appln. No. PCT/IB2022/052602, mailed on Sep. 21, 2022, 26 pages.

Symoens et al., "State-of-the-art of Coke Formation during Steam Cracking: Anti-Coking Surface Technologies," Industrial & Engineering Chemistry Research, Oct. 24, 2018, 57(48):16117-16136.

* cited by examiner

INTERNALLY HEATED REACTOR FOR HYDROCARBON CONVERSION

CLAIM OF PRIORITY

This application is a National Stage Application under 35 U.S.C. § 371 and claims the benefit of International Application No. PCT/IB2022/052602, filed Mar. 22, 2022, which claims priority to U.S. Provisional Application No. 63/166, 164 filed on Mar. 25, 2021, the entire contents of which are hereby incorporated by reference.

TECHNICAL FIELD

This disclosure relates to an apparatus and method for hydrocarbon conversion.

BACKGROUND ART

Hydrocarbon cracking ("cracking") and reforming are endothermic hydrocarbon conversion processes that require high temperatures in order to convert a hydrocarbon substrate into a product by promoting breaking of carbon-carbon and carbon-hydrogen bonds. For example, in a steam cracking process the hydrocarbon substrate ethane may be "cracked" into the product ethylene as it passes through one or more reactors, typically referred to as coils, that are disposed in a gas-fired furnace that reaches temperatures as high as 1200° C. The heat produced by the furnace must conduct through the reactor (coil) walls in order to reach the ethane, necessitating that the reactor walls reach a temperature that is higher than that required to remove two hydrogens from the ethane. The excessive temperatures promote creep and thermal degradation of the furnace tubes that make up the reactor, negatively impacting their service life. Costs for expired furnace tubes and associated downtime for replacement impacts profitability.

Temperature dependent formation of carbon-based fouling, typically referred to as coke, on the inner surface of hydrocarbon conversion reactors can negatively impact hydrocarbon conversion processes, and, by extension, profitability. For example, fouling can reduce furnace surface area availability, damage coatings and/or negatively impact surface treatment of reactor materials, or act as an insulator so that over time higher temperatures from the furnace are necessary in order for the substrate to reach the temperature required for breaking of carbon-carbon or carbon-hydrogen bonds. Increasing the furnace temperature ultimately increases the temperature of the reactor walls, increasing the rate of degradation related to creep and thermal degradation.

There is a need to minimize reactor wall temperatures in hydrocarbon conversion processes to promote longer service life of reactor wall components. Minimizing reactor wall temperatures may slow the rate of thermal degradation and the rate of fouling (coke deposition). The present disclosure addresses the need to minimize the temperatures of reactor walls in hydrocarbon conversion processes by placing the heat source within the reactor.

SUMMARY OF INVENTION

Provided herein is an apparatus for hydrocarbon conversion, the apparatus including a reactor and a reactor insert secured and disposed within an interior cavity of the reactor. The reactor is configured to permit addition of a feed stream comprising a hydrocarbon at an upstream end of the reactor and to permit discharge of a product stream at a downstream end of the reactor. The reactor insert is configured to provide heat to the interior cavity to promote conversion of hydrocarbons as the feed stream moves from the upstream end of the reactor to the downstream end of the reactor. The products of the conversion reaction are discharged at the downstream end as part of the product stream. In some embodiments, the reactor insert includes an electrical resistor that produces heat in response to receiving power. In some embodiments, the reactor insert includes a heat pipe. The apparatus disclosed provides for heating the reactor from the interior, eliminating the need for a gas-fired furnace that creates excessive heat that conducts through the reactor walls.

Also provided herein is a method of hydrocarbon conversion where a feed stream comprising a hydrocarbon is passed through a reactor containing a reactor insert to convert at least a portion of the hydrocarbon into a product that is removed from the reactor as part of a product stream, is also described.

The apparatuses and methods described can be implemented to minimize thermal degradation of and coke formation on the surface of reactor components typically associated with hydrocarbon conversion processes where heat is supplied externally to the reactor.

DESCRIPTION OF EMBODIMENTS

Figure 1:
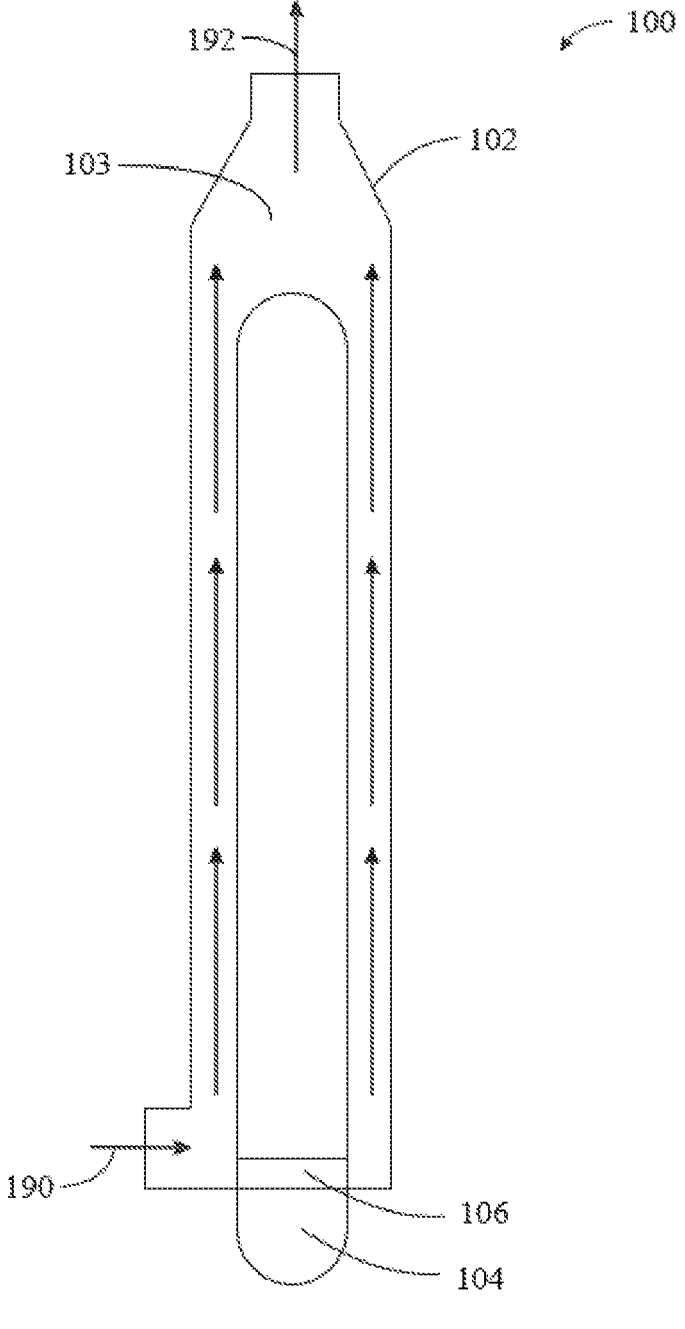
FIG. 1 is a schematic diagram of an embodiment of an apparatus for hydrocarbon conversion.

Provided herein is an apparatus for hydrocarbon conversion, the apparatus including a reactor and a reactor insert secured and disposed within an interior cavity of the reactor. The reactor is configured to permit addition of a feed stream comprising a hydrocarbon at an upstream end of the reactor and to permit discharge of a product stream at a downstream end of the reactor. The reactor insert is configured to provide heat to the interior cavity to promote conversion of at least a portion of the hydrocarbon to a product as the feed stream moves from the upstream end of the reactor to the downstream end of the reactor. The reactor insert is intended to include one or more reactor inserts. The product of the conversion reaction is discharged at the downstream end as part of the product stream. The term "product" in this context may include multiple species that are formed during the conversion reaction. Also provided herein is a method for hydrocarbon conversion that includes passing a feed stream comprising a hydrocarbon through the apparatus that is described.

The apparatuses and methods described herein can be implemented to reduce the temperature of pressure containing surfaces, which can reduce creep, increase material allowable stress, reduce thermal degradation, or any combination of these. This reduction in temperature of pressure containing surfaces can allow for a reduction in wall thickness, an increase in service life, and use of a lower cost material grade for the reactor. As described herein, there are several reactor configurations that may be implemented for internal heating. Furthermore, the apparatuses and methods described can reduce the production of hot spots, cold spots, or both in hydrocarbon conversion processing equipment. For example, the apparatuses and methods described can be implemented to provide consistent heat flux to a hydrocarbon feed stream.

Definitions

As used in this disclosure, the term "hydrocarbon" is used to include any organic compound made entirely of hydrogen and carbon atoms. For example, a hydrocarbon can be methane, ethane, propane, n-butane, isobutene, or any combination thereof. For example, a hydrocarbon can include an organic compound with 1-12 carbon atoms. For example, a hydrocarbon can include naphtha, liquefied petroleum gas, or any combination thereof. As used in this disclosure, the term "hydrocarbon conversion process" is used to include an endothermic process designed to break down, crack, or convert hydrocarbons. Examples include, but are not limited to, pyrolysis based processes such as steam cracking of lower alkanes, and catalyst mediated processes such as methane reforming. As used herein, the term "hydrocarbon conversion" is meant to include conversion of hydrocarbons that are endothermic in nature and require temperatures exceeding 500° C. Specifically, hydrocarbon conversion includes conversion of lower alkanes in alkenes, methane into carbon monoxide and hydrogen, syngas . . . .

As used in this disclosure, the terms "downstream" and "upstream" are used in relation to an overall flow direction of the feed stream flowing through a reactor as described herein, with the feed stream accepted at the upstream end and a product stream discharged at a downstream end.

As used in this disclosure, the term "C2-C4 alkene" is used to include ethylene, propylene, α-butylene, cis-β-butylene, trans-β-butylene, isobutylene, or any combination thereof.

As used herein, the term "reactor" is meant to include chemical reactors having an enclosed space or chamber in which a hydrocarbon conversion reaction takes place. Reactor types include, but are not limited to, coils used in steam cracking processes and reactor tubes used in steam methane reformers. Coils in steam cracking furnaces are formed from an assembly of furnace tubes, U-bends, wyes, and elbows that results in a serpentine conduit that extends from the point of entry to the point of exit of the furnace. Steam cracking furnaces may include one or more coils that may be connected by wyes at their corresponding upstream and downstream ends.

As used in this disclosure, the term "superalloy" is used to include an alloy that has the ability to operate at a high fraction of its melting point. Some characteristics typical of a superalloy include high mechanical strength, resistance to thermal creep deformation, high surface stability, and resistance to corrosion and/or oxidation.

As used in this disclosure, the term "refractory metal alloy" is used to include an alloy that is highly resistant to heat and wear. Some characteristics typical of a refractory metal alloy include high melting point (for example, above 2000° C.), high hardness at room temperature, and chemically inert.

Hydrocarbon Conversion Apparatus

FIG. 1 is a schematic diagram of an apparatus 100 for hydrocarbon conversion. The apparatus 100 can be used, for example, in an ethane steam cracking process. The apparatus 100 includes a reactor 102 having an interior cavity 103 and configured to receive a feed stream 190 at an upstream end and discharge a product stream 192 at a downstream end. A reactor insert 104 is disposed within the interior cavity 103 and held in place by securing means 106. The reactor insert 104 is configured to provide sufficient heat to the interior cavity 103 of the reactor 102 to convert hydrocarbon present in feed stream 190 to a product that is discharged as part of product stream 192.

The reactor insert 104 may be secured within the interior cavity of reactor 102 with securing means 106 using any suitable means known in the art, including, but not limited to mounts, brackets, clamps, or supports. A person skilled in the art would appreciate that securing means 102 may be constructed with a material that is suitable for use in temperature ranges typical for the hydrocarbon conversion process. The reactor insert 102 may be secured in one or more locations by securing means 106 within the interior cavity. The securing means 106 may be attached to the reactor insert 104. The securing means 106 may be configured to couple the reactor insert 104 to the reactor. In some embodiments, the reactor insert 104 may be secured by passing reactor insert 104 through the walls of the reactor 102.

In some embodiments, the apparatus 100 may include more than one reactor insert 104 secured within the interior cavity of reactor 102 by securing means 106. In some embodiments, the apparatus 100 includes multiple reactor inserts 104 that operate at different temperatures, such that the heat flux profile within the reactor 102 can be fine-tuned. In some embodiments, the apparatus 100 includes a furnace that operates in conjunction with the reactor insert 104. For example, the furnace operates at a temperature that provides heat similar to the heat provided by the reactor insert 104 within the reactor 102. In some embodiments, reactor 102 may be housed in a gas-fired furnace. It is contemplated that existing hydrocarbon conversion apparatuses may be retrofitted to include a reactor insert 104 while maintaining a position inside a gas-fired furnace. A hybrid hydrocarbon conversion apparatus where reactor 102 is housed inside a gas-fired furnace and includes a reactor insert 104 in the interior cavity provides an option to heat the feed both from an internal source and from an external source that is conducted through the walls of the reactor. In this scenario the external heat source may be minimized so as to reduce thermal degradation effects while compensating or preventing heat loss from the interior of the reactor and through the reactor walls. Furthermore, a hybrid hydrocarbon conversion apparatus may be used to balance costs associated with operating a gas-fired furnace and the reactor insert.

Figure 2:
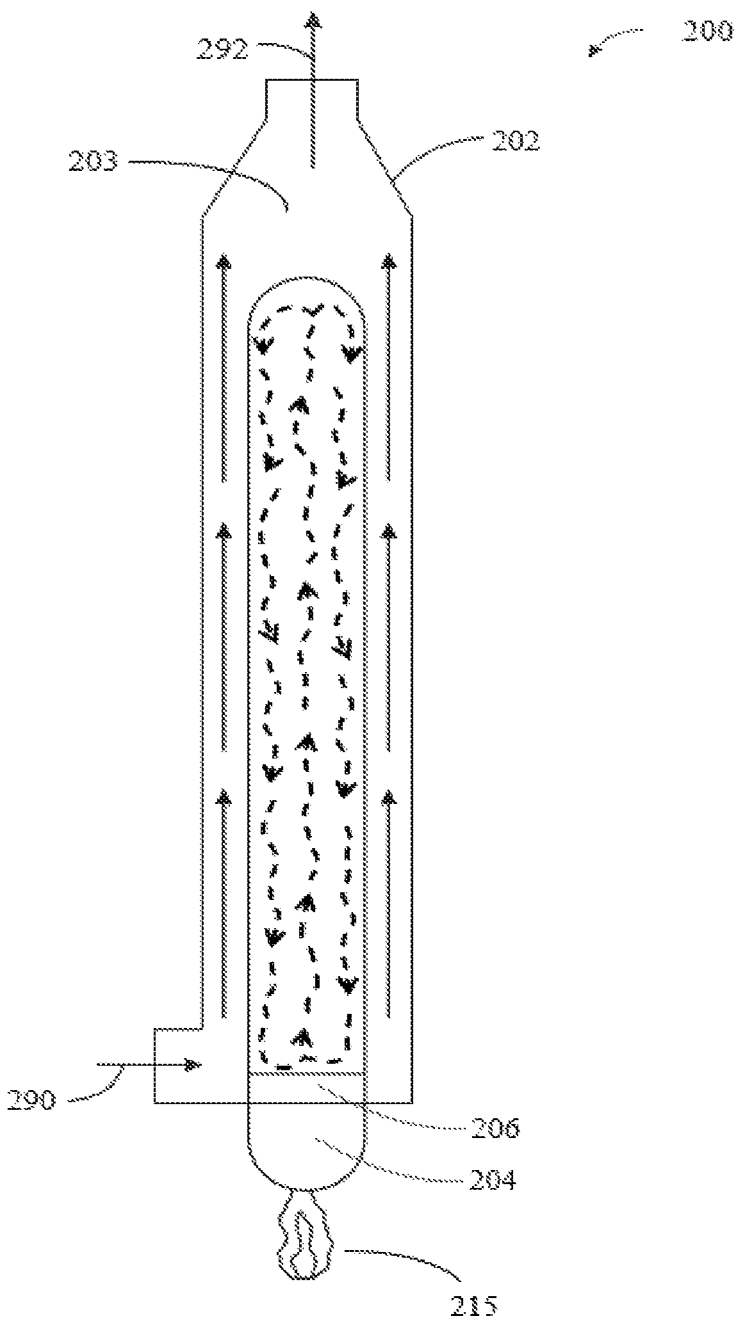
FIG. 2 is a schematic diagram of an embodiment of an apparatus having a heat pipe insert for hydrocarbon conversion.

FIG. 2 is a schematic diagram of an embodiment of a hydrocarbon conversion apparatus. The apparatus 200 can be substantially similar to the apparatus 100. For example, the apparatus 200 includes a reactor 202 having an interior cavity 203 and configured to receive a feed stream 290 at an upstream end and discharge a product stream 292 at a downstream end. A reactor insert 204 is disposed within the interior cavity 203 and held in place by securing means 206. The reactor insert 204 is configured to provide sufficient heat to the interior cavity 203 of the reactor 202 to convert hydrocarbon present in feed stream 290 to a product that is discharged as part of product stream 292.

For the embodiment shown in FIG. 2 the reactor insert 204 is a heat pipe. In some embodiments, the reactor insert 204 includes a housing. In some embodiments, the reactor insert 204 houses a working fluid (shown by dashed arrows), that circulates throughout the heat pipe. A heat source 215 may boil the working fluid which then travels as a vapor up the core of the heat pipe before condensing on the interior of the pipe near the end opposite the heat source 215. Condensation of the working fluid transfers heat to the interior cavity 203. Condensed working fluid may travel back to the end of the pipe nearest the heat source by gravity or due to capillary or wicking action of the interior surface of the pipe. Some non-limiting examples of working fluid include cesium, sodium-potassium alloy, potassium, sodium, lithium, or silver. The housing of the reactor insert 204 is made of a material compatible with the working fluid. That is, the material does not chemically react with the working fluid and is not detrimentally affected by the presence of the working fluid. In some embodiments, the housing of the reactor insert 204 is made of a superalloy including nickel, chromium, or any combination thereof. In some embodiments, the housing of the reactor insert 204 is made of a refractory metal alloy, such as niobium. In some embodiments, the housing of the reactor insert 204 is made of nickel, chromium, niobium, or any combination thereof. In some embodiments, the reactor insert 204 houses a wick. The wick is made of a material compatible with the working fluid and the housing of the reactor insert 204. In some embodiments, the wick includes sintered metal, capillary channels, a screen, mesh, fiber, a grooved wick, or any combination thereof.

The heat pipe is heated. The heat source 215 of heat to the heat pipe can be, for example, a chemical reaction (such as combustion), electrical heat (such as a resistance heater), inductive heat, or a combination of these. In cases where the source of heat to the heat pipe includes a chemical reaction, the apparatus 200 can include a burner or a flameless burner. In some embodiments, the chemical reaction employs a catalyst. In cases where the source of heat to the heat pipe includes electrical heat, the apparatus 200 can include a resistance heater. In cases where the source of heat to the heat pipe includes inductive heat, the heat pipe can have a sufficient amount of iron for adequate heat conductivity and structural integrity but not excessive amounts of iron to avoid excessive coke formation. In some embodiments, the housing of the reactor insert 204 includes a first portion and a second portion. The first portion can be configured to be exposed to an inductive reactor and can include a maximum amount of iron for the operating temperature of the inductive reactor. The second portion can be configured to provide heating for pyrolysis and can include a minimum amount of iron. The first portion and the second portion can be welded directly together or indirectly by an intermediate material in between the first and second portions for improved welding.

In some embodiments, the heat pipe is configured to heat the feed stream to a temperature from 500° C. to 1500° C. In some embodiments, the heat pipe (reactor insert 204) is configured to provide a surface heat flux of at least 75 W/cm$^2$, from 75 W/cm$^2$ to 250 W/cm$^2$, from 207 W/cm$^2$ to 224 W/cm$^2$, or up to 1380 W/cm$^2$. In some embodiments, the heat pipe (reactor insert 204) is configured to provide a surface heat flux of at least 5000 W/m$^2$, from 5000 W/m$^2$ to 100000 W/m$^2$, from 100000 W/m$^2$ to 250000 W/m$^2$, or up to 400000 W/m$^2$ at its operating temperature.

Figure 3:
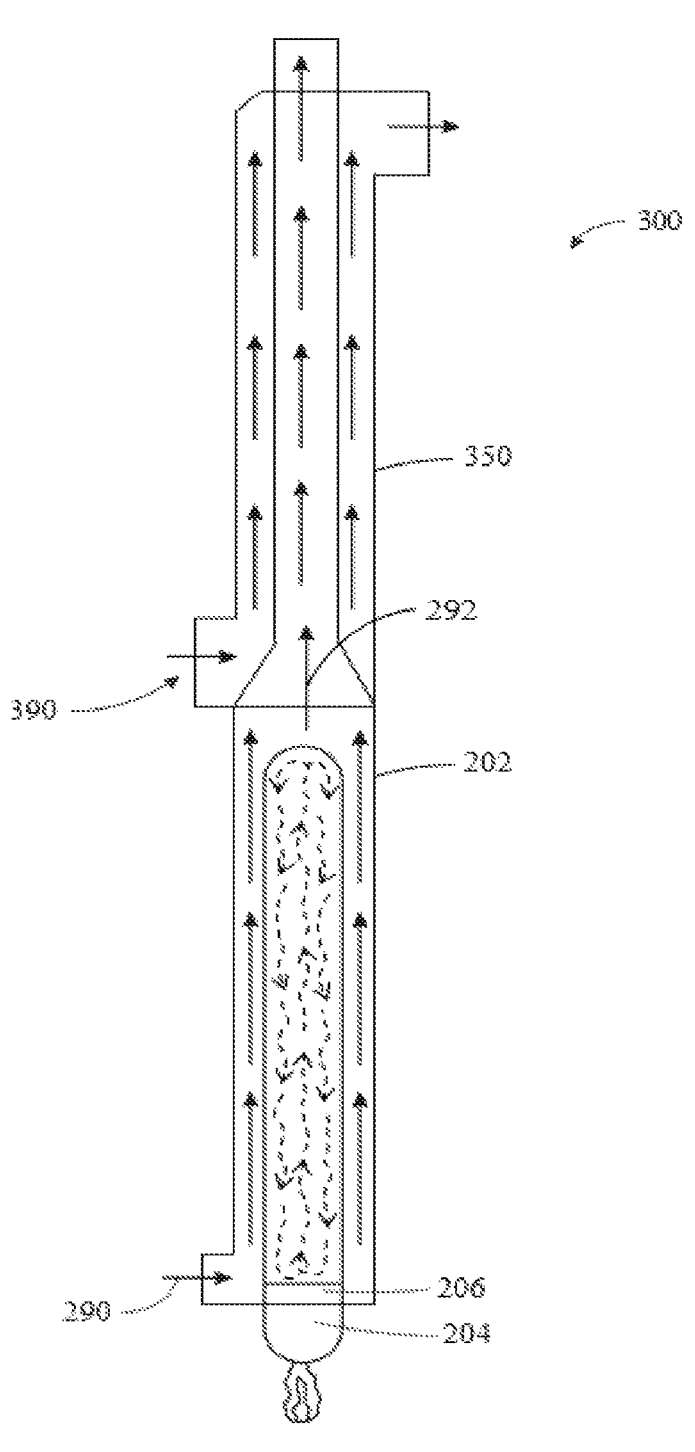
FIG. 3 is a schematic diagram of an embodiment of an apparatus for hydrocarbon conversion including a primary quench exchanger.

FIG. 3 is a schematic diagram of an embodiment of a hydrocarbon conversion apparatus. The apparatus 300 includes all the components of apparatus 200 and also includes additional components. In some embodiments, the apparatus 300 includes a primary quench exchanger (PQE) 350. In some embodiments, the PQE 350 surrounds a portion of the reactor 202. In some embodiments, the PQE 350 is downstream relative to the reactor insert 204. The PQE 350 can be used as a quench to cool the product stream 292 after it is discharged from reactor 202. In some embodiments, the PQE 350 is configured to receive a cooling fluid 390. The cooling fluid 390 can include water. For example, the cooling fluid 390 is boiler feedwater. Heat is transferred from the product stream 292 that is discharged from reactor 202 to the cooling fluid 390 flowing through the PQE 350. In some embodiments, at least a portion of the cooling fluid 390 evaporates as it flows through the PQE 350. In some embodiments, the cooling fluid 390 flows through the PQE 350 in a cross-flow configuration in relation to the product stream 292. In some embodiments, the cooling fluid 390 flows through the PQE 350 in a parallel-flow configuration in relation to the product stream 292. In some embodiments, the cooling fluid 290 flows through the PQE 350 in a counter-flow configuration in relation to the hydrocarbon fluid flowing through the reactor 202.

Figure 4:
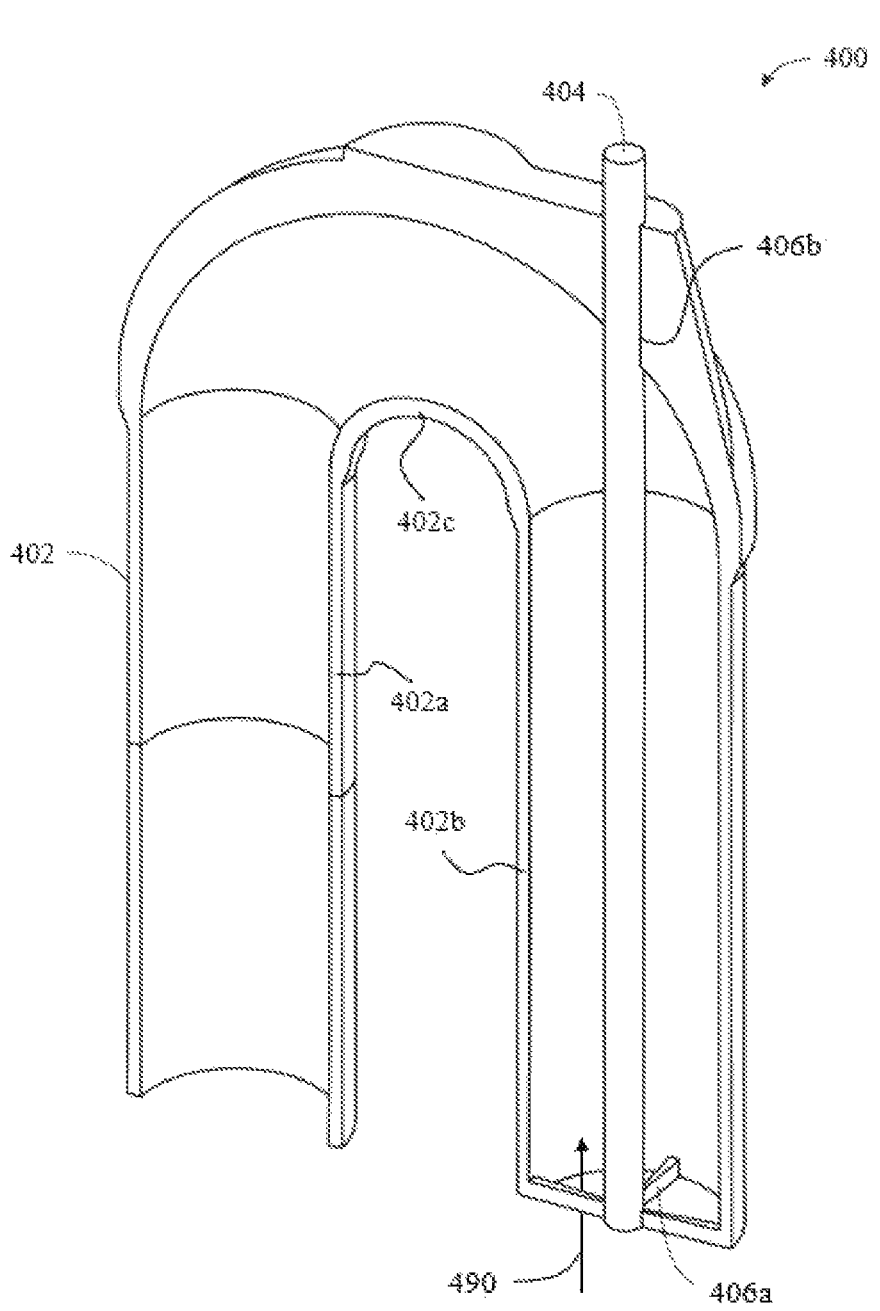
FIG. 4 is a schematic diagram of a section of an embodiment of an apparatus for hydrocarbon conversion.

FIG. 4 is a schematic diagram of a section of an embodiment of a hydrocarbon conversion apparatus. The embodiment in FIG. 4 includes an arrangement of tubes and a U-bend that resembles sections typically found in a steam cracking coil. A section of a hydrocarbon conversion apparatus 400 is displayed in FIG. 4 and includes a section of a reactor 402 formed from two straight tube sections 402a (formed from two tubes) and 402b connected by a U-bend 402c. A product stream 490 passes through the interior cavity that exists from (and may be a continuation from a previous section) the assembly of the tubes and U-bend. The section of an embodiment disclosed in FIG. 4 differs from a section of a typical cracking coil with the inclusion of reactor insert 404. The reactor insert 404 is disposed within the interior cavity in the section tube section 402b and is held in place at two locations by securing means 406a and 406b. Note the securing means are different in that securing means 406a includes a mount that is secured to the reactor insert 404 and the wall of reactor 402 in the tube section 402b, while securing means 406b involves passing reactor insert 404 through the wall of reactor 402 in the U-bend 402c. As the product stream 490 progresses along the interior cavity (in the direction of the arrow) product is formed as a result of the temperature in the interior cavity due to the heat provided by reactor insert 404. The product stream may leave the section of hydrocarbon conversion apparatus 400 shown in FIG. 4 and proceed into a subsequent section, or may be discharged from hydrocarbon conversion apparatus 400 as part of a product stream (not shown).

In some embodiments, the reactor insert may extend along a length of a straight portion of the reactor. In some embodiments, the securing means is configured to couple the reactor insert to the reactor to prevent bending of the reactor insert to and prevent the reactor insert from being in direct contact (for example, touching) an inner wall of the reactor.

The apparatus described herein may be suitable for use in any hydrocarbon conversion process that traditionally includes heating a reactor and the feedstock passing through the reactor by supplying heat externally and allowing conduction through the reactor walls. Processes applicable for use of the apparatus disclosed herein include steam cracking and methane reforming. In some embodiments, the apparatus is used to convert a hydrocarbon in the feed stream to a C2-C4 alkene, syngas, or combinations thereof. In some embodiments, the apparatus is used to convert ethane in the feed stream to ethylene.

Steam cracking is a well-known process where a feedstock such as naptha, liquefied petroleum gas (LPG), ethane, propane, or butane, is passed, along with steam, through a serpentine conduit (referred to as a "coil") that is housed in gas-fired furnace and formed from an assembly of furnace tubes, U-bends, elbows, and wyes. The feed is passed through the coil at high flow rates resulting in very short residence times. In ethane cracking, a feed stream is introduced at an upstream end of one or more coils housed in a furnace, a portion of the ethane present in the feed is converted to ethylene as it passes along the length of the coil, and a product stream comprising ethylene, unreacted ethane, and steam from the feed stream, are discharged at a downstream end. A typical steam cracking coil may be suitable for use in the apparatus described herein.

In some embodiments, the reactor may include coils typically used in a steam cracking process. In some embodiments, the reactor may include a coil that is suitable for use in an ethane steam cracking process. In one embodiment, the reactor comprises a coil. In some embodiments, the reactor is a steam cracking reactor.

Steam methane reforming is a process where lighter hydrocarbons (such as methane) and steam are converted, in the presence of a catalyst and at high temperatures, to carbon monoxide and hydrogen (syngas). Syngas can undergo further conversions to form more hydrogen and carbon dioxide, which, along with residual carbon monoxide, can be removed from the product stream to leave pure hydrogen which can be used in a number of commercially relevant industrial processes. Steam methane reformers typically include numerous tubes that contain one or more catalysts capable of converting lighter hydrocarbons and steam.

In some embodiments, reactor may include reactors, or tubes, typically used in a steam reforming process. The reactor may be used as a steam reforming reactor. This reactor can be used to produce syngas by reaction of hydrocarbons with water in the presence of a catalyst. The catalyst is typically nickel-based. In some cases, the steam methane reformer includes tubes at least partially filled with a catalyst and disposed within a high temperature furnace. In some embodiments, the reactor acts as a steam reforming reactor and some or all of the remaining reactor volume not occupied by the reactor insert includes the catalyst.

The present disclosure contemplates embodiments that include known reactor features that increase mixing and heat transfer or encompass materials, coatings, or treatments that limit formation of fouling on the inner surface of the reactor. In some embodiments, the reactor has the shape of a Mixing Element Radiant Tube (MERT, a technology developed by Kubota Materials Canada Corporation). In some embodiments, the reactor has protuberances on its inner wall, which can increase mixing and heat transfer within the reactor. In some embodiments, the reactor has a constant axial profile. In some embodiments, the reactor has a variable axial profile. In some embodiments, the reactor interior surface includes a coating. In some embodiments, the coating is applied to the reactor to reduce fouling on an inner wall of the reactor. In some embodiments, the reactor is surface treated. In some embodiments, the surface treatment is applied to the reactor to reduce fouling on an inner wall of the reactor.

Minimizing the loss of heat from the interior cavity and through the reactor walls may negatively impact efficiency as the reactor insert may be required to increase heat output in order to compensate. Preventing heat loss in some embodiments may provide options for reducing the heat output of the reactor required. In some embodiments, an exterior of the reactor is insulated. For example, the reactor is surrounded by an insulating material. Insulating the exterior of the reactor can maintain heat within the interior cavity of the reactor and can maintain structural and/or metallurgical stability of the reactor.

Reactor Insert

Design of reactor insert considerations may include, but is not limited to, operating temperature, heat profile along the length of reactor, shape and size, and composition. It is essential that the reactor insert is capable of providing the heat necessary to promote conversion of the target hydrocarbon. Temperature requirements will depend upon the nature of the hydrocarbon conversion process to which the apparatus described herein is to be utilized. In some embodiments, the reactor insert may be suitable for use with a feed stream comprising naphtha, liquefied petroleum gas, ethane, propane, butane, or any combination thereof. In some embodiments, the reactor insert is configured to heat the interior cavity of the reactor to a temperature from 115° C. to 1500° C., from 450° C. to 1100° C., or from 650° C. to 1000° C.

In some embodiments, reactor insert is made of a material that can be used to supply heat. In some embodiments, the reactor insert is an electrical resistor that converts electricity into heat. In some embodiments, the reactor insert includes at least one metallic electrical resistance heating material. Some non-limiting examples of metallic electrical resistance heating materials include nichrome, KANTHAL®, cupronickel, or any combination thereof.

The heat flux along the length of the reactor insert may be uniform or non-uniform. Tailoring heat flux along the length of reactor insert may provide benefits for optimization of process conditions to achieve process goals. The tailored heat flux can be advantageous for reaction kinetics and lead to increased selectivity and yield of preferred products in the hydrocarbon conversion process.

The reactor insert can be installed similarly to thermocouples in gas fired pyrolysis furnaces. For example, the reactor insert can be installed in a tubular portion of the reactor, such as in U-bends, wyes, or elbows of the reactor. In some embodiments, the reactor insert runs a portion of the length of a straight portion of the reactor. In some embodiments, the reactor insert is straight. In some embodiments, the reactor insert is curved. In some embodiments, a first portion of the reactor insert is straight, and a second portion of the reactor insert is curved. In some embodiments, the reactor insert runs the length of a straight portion of the reactor with a curved portion of the reactor having no reactor insert. In some embodiments, the reactor insert runs the length of reactor. In some embodiments, the reactor insert runs a partial length of the reactor.

The reactor insert can also run through other components of the reactor, such as wyes or tees. In some embodiments, the reactor insert runs through a curved portion of the reactor. In some embodiments, the reactor insert runs through a straight portion of the reactor. In some embodiments, a first portion of the reactor insert is straight and located in a straight portion of the reactor, and a second portion of the reactor insert is curved and located in a curved portion of the reactor.

Depending on the rigidity of the reactor insert, the reactor insert may be held in place by mounting the reactor insert by securing means down the length of a straight portion or portions of the reactor and/or reactor component(s) of the reactor to prevent bending and/or direct contact with a wall of the reactor. In some embodiments, the reactor insert can be held in place by securing means such as a mount to an inner wall of the reactor. In some embodiments, the apparatus includes multiple securing means, such that the reactor insert can be mounted at various locations in the reactor. For example, the reactor insert can be held in place using multiple mounts to the inner wall of the reactor at multiple locations along the reactor insert. In some embodiments, the securing means may be used to enhance mixing of the feed stream flowing through the interior cavity of the reactor. In some embodiments, the securing means may be used to enhance heat transfer by promoting turbulent flow. For example, the securing means can be configured to increase the heat transfer rate from the reactor insert to the feed stream by as much as 50%.

In some embodiments, a reactor insert can have a low surface roughness on its outer surface which can minimize fouling on the reactor insert. In some embodiments, the reactor insert has a surface roughness less than 200 μinch Ra or less than 100 μinch Ra.

In some embodiments, the reactor insert is configured to increase heat transfer and homogenization of process gas temperature and concentration. In some embodiments, the reactor insert has a high surface roughness. In some embodiments, the reactor insert has a surface roughness greater than 200 μinch Ra or greater than 300 μinch Ra.

In some embodiments, the reactor insert has the shape of a twisted tube, which can increase mixing and heat transfer within the reactor. In some embodiments, the reactor insert has the shape of a Mixing Element Radiant Tube (MERT, a technology developed by Kubota Materials Canada Corporation), which can increase mixing and heat transfer within the reactor.

As can be seen in the figures, the reactor insert is preferably located in a position that is essentially equidistant from all sides of the interior wall of the reactor at a nearly identical position along the length of the reactor. For reactors that are in the form of a tube the reactor insert is held in place at a position that approximates the centerline for straight sections and the centerline radius for curved sections. The reactor insert may comprise a shape that does not match the shape of the reactor. For example, the reactor insert may have circular cross section whereas the reactor has a square cross section at the similar points along the length of the reactor. Alternatively, the reactor may have a circular cross section (similar to a coil) whereas the reactor insert may have an irregular cross-section shape at similar points along the length of the reactor. The shape of the reactor and the reactor insert may be similar at some points and different at other points along the length of the reactor.

In some embodiments, the reactor insert has protuberances which can increase mixing and heat transfer within the reactor. For example, the reactor insert includes fins which can increase the heat transfer surface area of the reactor insert. In some embodiments, the reactor insert has a constant cross section. In some embodiments, the reactor insert has a variable cross section. In some embodiments, the reactor insert includes a coating. In some embodiments, the coating is applied to the reactor insert to reduce fouling on an exterior of the reactor insert. In some embodiments, the reactor insert is surface treated. In some embodiments, the surface treatment is applied to the reactor insert to reduce fouling on an exterior of the reactor insert.

In some embodiments, the reactor insert includes a metallic sheath. In some embodiments, the reactor insert includes a ceramic sheath. In some embodiments, the metallic or ceramic sheath encloses the reactor insert and protects the electrical heating element. Such an enclosure can allow optimization of the material exposed to the process conditions, such as a process composition and a process temperature. The term "sheath" is meant to encompass close fittings or coatings that enclose at least a part of the reactor insert. A sheath should be designed to promote heat conduction, either by ensuring a tight fit or by the use a bonding agent to ensure direct contact.

In some embodiments, the reactor insert has a coefficient of thermal expansion that is less than or equal to that of the reactor. In some embodiments, the reactor insert has a coefficient of thermal expansion that is greater than or equal to that of the reactor. In some embodiments, a ratio of the coefficient of thermal expansion of the reactor can be greater than a coefficient of thermal expansion of the reactor insert by a ratio, such that an expanded length of the reactor insert and the reactor are equal.

In some embodiments, the reactor insert includes a first end and a second end. In some embodiments, the first end of the reactor insert is connected to an electrical power source. In some embodiments, the second end of the reactor insert is connected to an electrical power source. In some embodiments, the second end of the reactor insert is attached to the securing means attached to the reactor. In some embodiments, the second end of the reactor insert is free and not attached to another component.

In some embodiments, the reactor insert is cylindrical with a circular cross-section, which can reduce a hydraulic diameter and therefore pressure drop and fouling along the reactor and reactor insert. In some embodiments, the reactor insert has a cylindrical shape. In some embodiments, the reactor insert is a hollow tube. In some embodiments, the reactor insert is a cylindrical hollow tube.

In some embodiments, the reactor insert is configured to provide uniform heat generation within the interior cavity of the reactor. In some embodiments, the reactor insert is configured to provide non-uniform heat generation within the interior cavity of the reactor. Non-uniform heat generation can provide the ability to control heat distribution along the cracking path for optimal cracking kinetics. Non-uniform heat generation can be accomplished by, for example, having a reactor insert with multiple separate electrical elements within the reactor insert, each configured to supply different or the same heat inputs. Non-uniform heat generation can be accomplished by, for example, having the electrical resistance properties of the electrical conductor vary across the length of the reactor insert, for example, by varying diameter or conductor material.

Method for Hydrocarbon Conversion

A method for hydrocarbon conversion can be implemented using the apparatus described herein. The method comprises heating the interior cavity of a reactor having an upstream end and a downstream end; introducing a feed stream comprising a hydrocarbon into the interior cavity at the upstream end; converting in the interior cavity at least a portion of the hydrocarbon into a product; discharging a product stream comprising the product from the downstream end, wherein the interior cavity is heated by a reactor insert disposed within the interior cavity.

The method is suitable for use for various hydrocarbon conversion processes. In some embodiments, the method is suitable for converting a lower alkane into an alkene. In some embodiments, the method is suitable for converting ethane into ethylene. In some embodiments, the method is suitable for converting methane and steam into carbon monoxide and hydrogen (syngas). Syngas can be further processed to produce relatively pure hydrogen.

In some embodiments, the feed stream comprises a C2-C4 alkane. In some embodiments, the feed stream comprises ethane. In some embodiments, the feed stream comprises ethane and steam. In some embodiments, the feed stream comprises methane. In some embodiments, the feed stream comprises methane and steam. In some embodiments, the feed stream comprises naphtha, liquefied petroleum gas, ethane, propane, butane, or combinations thereof.

In some embodiments, the product stream comprises a C2-C4 alkene. In some embodiments, the product stream comprises ethylene. In some embodiments, the product stream comprises carbon monoxide. In some embodiments, the product stream comprises hydrogen ($H_2$). In some embodiments, the product stream comprises syngas.

A person skilled in the art would understand that different hydrocarbon conversion processes may have different process conditions and that optimization of process conditions is generally recommended in order to achieve particular process goals. A user may choose conditions that promote yield over selectivity to a desired product, and vice versa. Process conditions include, but are not limited to, the temperature within the interior cavity, the residence time of the feed stream, and consequently the hydrocarbon, within the interior cavity, flow rate of the feeds stream, the heat flux profile applied to the interior cavity, and the relevant pressure settings (within the reactor and the pressure differential).

The temperature within the interior cavity plays a pivotal role in the method of hydrocarbon conversion process. The temperature must be high enough to promote conversion of the hydrocarbon but low enough to reduce formation of unwanted byproducts. Also, as the feed stream moves through the interior cavity and products are produced there may be a subtle shift to additional products that are the result of conversion of the product itself. It is contemplated that the heat flux profile along the length of the interior cavity may be constant or the heat flux profile along the length may be varied. For example, it may be beneficial to heat the upstream regions of the interior cavity to a temperature that promotes conversion of the hydrocarbon to a desired product and subsequently lower the temperature of the downstream region to minimize further conversion of the product. The heat flux profile along the length may vary in steps or may be gradual. The reactor insert may be designed to allow optimization of the heat flux profile along the length.

In some embodiments, the feed stream in the interior cavity is heated to a temperature of from 115° C. to 1200° C., from 450° C. to 1100° C., or from 650° C. to 1000° C. In some embodiments, the reactor insert provides the heat flux necessary to heat the feed stream to a temperature of from 115° C. to 1200° C., from 450° C. to 1100° C., or from 650° C. to 1000° C.

In some embodiments, the feed stream has a residence time in the reactor from 0.02 s to 4.5 s, from 0.05 s to 4.5 s, from 0.1 s to 2.5 s, or from 0.1 s to 1.25 s. In some embodiments, the feed stream has a pressure at an outlet of the reactor from 15 kPag to 250 kPag, from 25 kPag to 250 kPag, from 50 kPag to 250 kPag, from 15 kPag to 200 kPag, 25 kPag to 200 kPag, from 50 kPag to 200 kPag, from 15 kPag to 120 kPag, from 25 kPag to 120 kPag, or from 50 kPag to 120 kPag.

EXAMPLES

As will be appreciated by a person of ordinary skill in the art, a reactor for ethane pyrolysis is designed to optimize the residence time, temperature profile, pressure profile, heat flux profile, and steam to alkane ratio to obtain the desired alkane conversion and yield. As an example of this design process, a hydrocarbon conversion apparatus comprising electric inserts and tube reactors was modeled using experimental data in use of an existing, typical radiantly heated pyrolysis reactor (or coil) in an existing pyrolysis furnace. Table 1 shows the dimensions and process conditions for a Millisecond Furnace (MSF) originally developed by M W Kellogg. The MSF includes 152 separate tubes or coils, referred to as reactors, each with an inside diameter of 1.5", outside diameter of 2.01", and length within the radiant section of the furnace of 42 ft. Process conditions included flows of 37,000 lb/hr of ethane and 18,500 lb/hr of steam, pre-heated to a temperature of 705° C. The exit temperature of the pyrolysis gas (cracked gas) for the above conditions in the MSF was 882° C.

TABLE 1

| Design Parameters | | |
| --- | --- | --- |
| | Millisecond Furnace | Insert Design Example 1 |
| Reactor length (ft) | 42.0 | 27.0 |
| Reactor inside diameter (in) | 1.5 | 3.39 |
| Reactor outside diameter (in) | 2.01 | N/A |
| Number of reactors | 152 | 152 |
| Ethane inlet flow rate (lb/hr) | 37,000 | 37,000 |
| Steam inlet flow rate (lb/hr) | 18,500 | 18,500 |
| Ethane and steam inlet temperature (° C.) | 705 | 705 |
| Cracked gas outlet temperature (° C.) | 882 | 882 |
| Internal surface area of single reactor ($m^2$) | 1.53 | 2.23 |
| Electric insert outside diameter (in) | N/A | 2.83 |
| External surface area of single electric reactor insert ($m^2$) | N/A | 1.86 |
| Volume within single reactor ($m^3$) | 0.0146 | 0.0146 |
| Average gas density within reactor ($kg/m^3$) | 0.78 | 0.78 |
| Average gas viscosity within reactor (Pa · s) | $3.1 \cdot 10^{-5}$ | $3.1 \cdot 10^{-5}$ |
| Average gas thermal conductivity within reactor (W/(m · K)) | 0.15 | 0.15 |
| Average gas specific heat capacity within reactor (J/(kg · K)) | 3598 | 3598 |
| Average gas Prandtl number within reactor | 0.75 | 0.75 |
| Average gas velocity within single reactor (m/s) | 51.5 | 33.1 |
| Residence time of gas within single reactor (s) | 0.25 | 0.25 |

TABLE 1-continued

| | Design Parameters | |
| --- | --- | --- |
| | Millisecond Furnace | Insert Design Example 1 |
| Average convective heat transfer within reactor (W/(m² · K)) | 418 | 344 |
| Average convective heat transfer coefficient multiplied by heated surface area within reactor (W/K) | 640 | 640 |
| Pressure drop from inlet to outlet of a single reactor (kPa) | 7.4 | 7.4 |

To design an electric insert and reactor to replace each MSF furnace reactor, the following parameters were calculated: residence time, internal surface area, convective heat transfer coefficient, and pressure drop. See Table 1 for a summary of the calculation results and several intermediate calculation results for modeled Insert Design Example 1. There are numerous ways to design the electric insert and reactor. This example gives one possible method and is not meant to limit or prescribe a specific method. For this example, the dimensions of an electric insert and reactor were found that matched the: (1) residence time; (2) pressure drop; (3) exit temperature; and (4) multiplication of the convective heat transfer coefficient and heated surface area within the MSF reactor for the case of the equivalent reactor process inlet conditions. Again, other constraints on the design could be chosen as there is no unique optimization. Table 1 indicates that an electric insert with outside diameter 2.83 inches (in), inside diameter 3.39 in and length 27 feet (ft) achieves constraints (1), (2), and (4). To match the third (3) constraint a numerical simulation model was created of the electric insert and reactor that included the chemical reaction kinetics, gas physical properties and geometric dimensions. The model outputs are temperature, pressure, and gas composition along the reaction length. The heat flux from the electric insert was adjusted until the target exit temperature was achieved. A numerical model of an MSF reactor was also created and solved for comparison. The MSF model used a heat flux profile typical of a radiant furnace heated by combustion burners.

Figure 5:
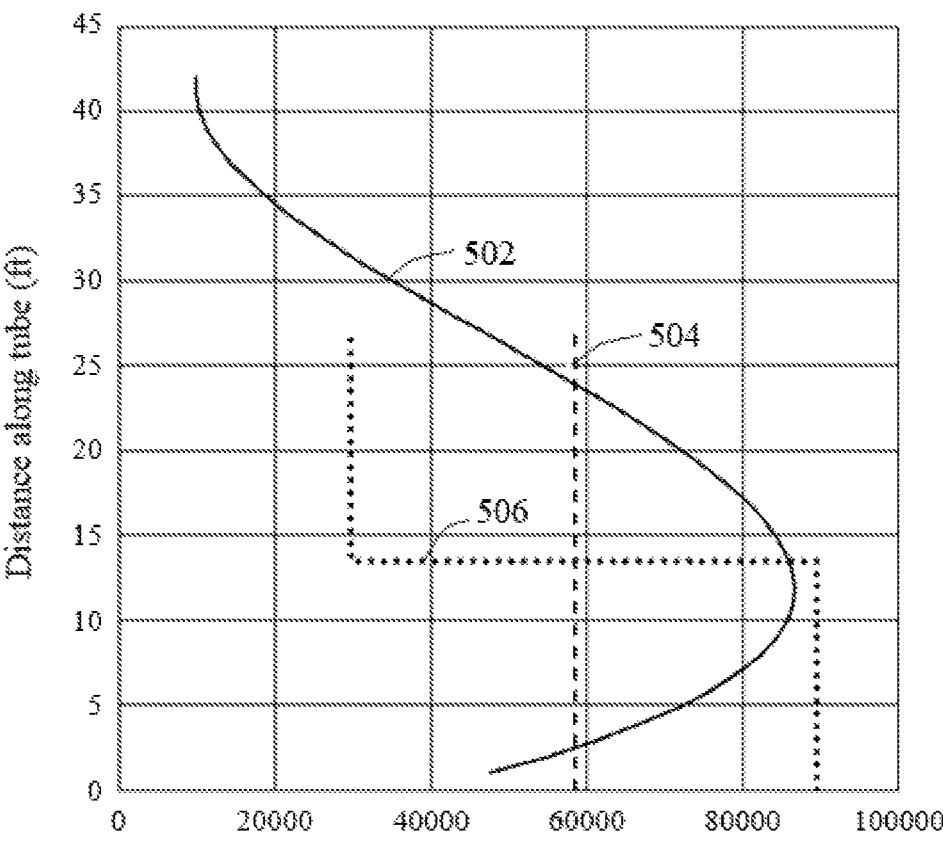
FIG. 5 is a plot illustrating surface heat flux vs. distance along length of the apparatus for a millisecond furnace and the electric insert design examples.

In example 1a, a uniform electric heat flux along the length of the electric insert equal to 58,400 W/m² was required to achieve the target exit temperature of 882° C. In example 1b, a non-uniform electric heat flux was applied. FIG. 5 shows a plot of the heat flux profile as a function of reactor length for the MSF, electric insert, and reactor examples. The solid line 502 shows the non-uniform heat flux from combustion on the original MSF reactor. The dashed line 504 shows the uniform electric heat flux of example 1a. The dotted line 506 shows the non-uniform electric heat flux of example 1b.

Figure 6:
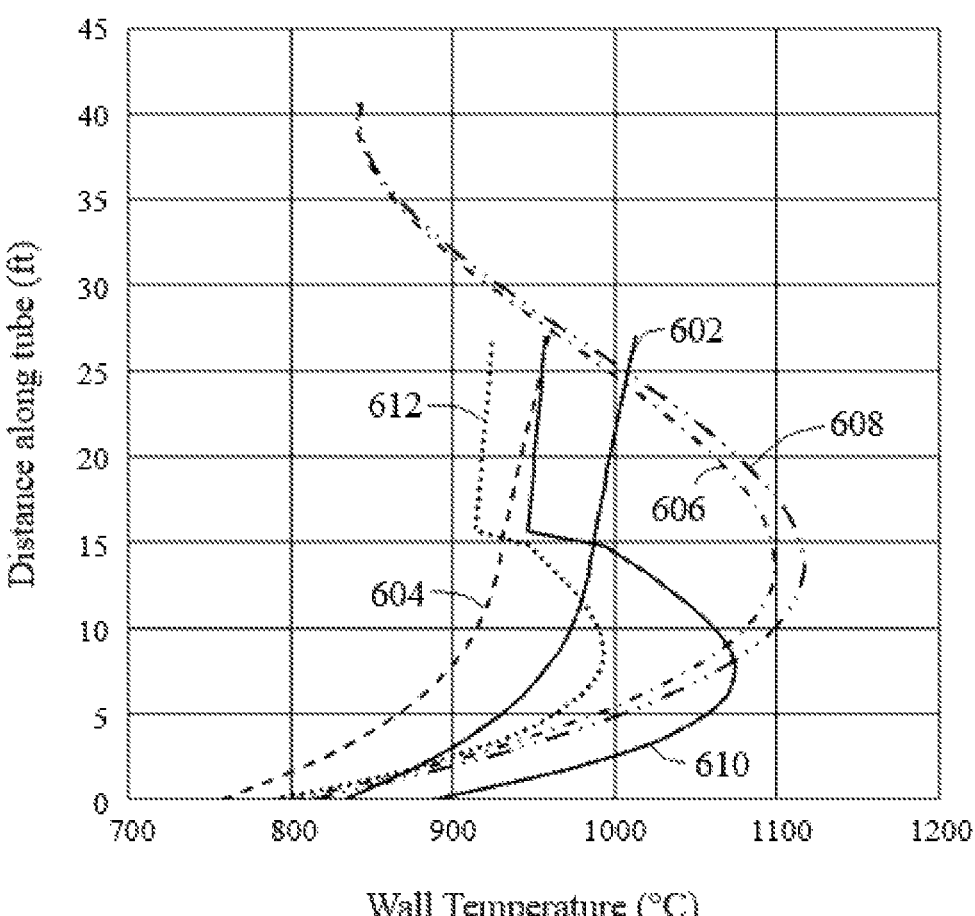
FIG. 6 is a plot illustrating inside and outside surface wall temperature vs. distance along length of a millisecond furnace and the electric insert design examples.

Table 2 shows the numerical model results for a single MSF reactor and for the electric insert and reactor examples. With respect to example 1a, the MSF reactor and electric insert and reactor have equal exit gas temperatures, however, the electric insert and reactor requires 4 kW more heat input. The conversion by weight of ethane is 4% higher and the ethylene yield by weight 0.9% lower with the electric insert and reactor vs. the MSF reactor. The result is that the ethylene production is 16,946 lb/hr for the MSF reactor and 17,767 lb/hr for the electric insert and reactor. This is an ethylene production improvement of 5% relative to the MSF reactor. Also noteworthy is the decrease in the severity, which is defined as the ratio of propylene to ethylene production. The electric insert and reactor severity is 13% lower relative to the MSF reactor. In addition, the reactor average and maximum temperatures are much lower for the electric insert and reactor design thus demonstrating an advantage of the electric insert design. Specifically, the maximum temperature seen on the MSF reactor was 1117° C. on its outside surface, which would be exposed radiantly to the combustion flame used for heating. By contrast, the electric insert and reactor design has a reactor maximum temperature of 959° C., which is 158° C. lower. A reactor temperature in this range will result in a longer useful life for the reactor or allow the use of less expensive alloys for construction. The maximum surface temperature of the electric insert is observed to be 1012° C. This is 87° C. lower than the maximum MSF reactor inside temperature of 1099° C. This will result in slower coke formation resulting in a longer production time between decoking. FIG. 6 shows the surface temperature profiles versus length calculated for the MSF reactor and electric insert and reactor examples. The solid line 602 is the electric insert surface temperature profile for example 1a. The dashed line 604 is the inside surface temperature of the reactor surrounding the electric insert for example 1a. The dash-dot line 606 is the MSF reactor inside surface temperature profile. The dash-dot-dot line 608 is the MSF reactor outside surface temperature profile.

A constant heat flux along the electric insert to achieve the target exit temperature was a design choice in Example 1a. A multi-zone heat flux profile could be chosen to further optimize pyrolysis conversion and yield. Example 1b uses the same geometric design and gas inlet conditions as Example 1a but changes the constant electric heat flux to a non-uniform profile. Specially, the second half of the electric insert length has a heat flux of one third that of the first half of the electric insert length. To achieve the gas exit temperature of 882° C., the second half of the electric insert required an electric heat flux of 29,700 W/m² and the first half a value three times higher at 89,380 W/m². The electric insert heat flux profile is shown in FIG. 5 as the line 506.

Table 2 also provides the numerical model results for example 1b. The non-uniform electric heat flux profile results in a 4% higher required heat transfer to the gas to achieve the target gas exit temperature of 882° C. relative to the MSF reactor. However, the conversion by weight of ethane is 12% higher and the ethylene yield by weight is 3% lower with the electric insert and reactor of example 1b vs. the MSF reactor. The result is that the ethylene production is 19,897 lb/hr for the electric insert and reactor as compared to 16,946 lb/hr for the MSF reactor. This is an ethylene production improvement of 17% relative to the MSF reactor. The electric insert and reactor of example 1b severity is 33% less relative to the MSF reactor. The non-uniform electric heat flux of example 1b results in a reactor maximum wall temperature of 993° C. This is 106° C. lower than the maximum inside reactor temperature observed in the MSF reactor. In FIG. 6, the solid line 610 is the electric insert surface temperature for example 1b, and the dotted line 612 is the reactor wall temperature. Examples 1a and 1b differ only by the chosen electric heat flux profile but serve to show both the flexibility for both process optimization and reduction in reactor wall temperature.

TABLE 2

| | Millisecond Furnace | Electric Insert Design Example 1a | Electric Insert Design Example 1b |
|---|---|---|---|
| Total heat transfer to a single reactor (kW) | 104.5 | 108.5 | 119.1 |
| Ethane conversion by weight (%) | 54.8 | 58.1 | 66.4 |
| Ethylene yield by weight (%) | 85.9 | 85.0 | 83.3 |
| Ethylene production (152 reactors) (lb/hr) | 16,946 | 17,767 | 19,897 |
| Severity by weight | 0.017 | 0.015 | 0.012 |
| Reactor inside average surface temperature (° C.) | 970 | 906 | 933 |
| Reactor outside average surface temperature (° C.) | 981 | 906 | 933 |
| Reactor inside maximum surface temperature (° C.) | 1099 | 959 | 993 |
| Reactor outside maximum surface temperature (° C.) | 1117 | 959 | 993 |
| Electric insert inside average surface temperature (° C.) | N/A | 965 | 992 |
| Electric insert maximum surface temperature (° C.) | N/A | 1012 | 1074 |

While this specification contains many specific implementation details, these should not be construed as limitations on the scope of what may be claimed, but rather as descriptions of features that may be specific to particular embodiments. Certain features that are described in this specification in the context of separate embodiments can also be implemented, in combination, in a single implementation. Conversely, various features that are described in the context of a single implementation can also be implemented in multiple embodiments, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a", "an", or "the" are used to include one or more than one unless the context clearly dictates otherwise. The term "or" is used to refer to a nonexclusive "or" unless otherwise indicated. The statement "at least one of A and B" has the same meaning as "A, B, or A and B". In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section. As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described embodiments should not be understood as requiring such separation or integration in all embodiments, and it should be understood that the described components and systems can generally be integrated together or packaged into multiple products. For example, components from any of the apparatuses 100, 200, 300, or 400 can be combined with components from any of the other apparatuses 100, 200, 300, or 400. For example, the reactor insert may include a combination of an electrical resistor and a heat pipe).

Accordingly, the previously described example embodiments do not define or constrain the present disclosure. Other changes, substitutions, and alterations are also possible without departing from the spirit and scope of the present disclosure.

INDUSTRIAL APPLICABILITY

The present disclosure relates to endothermic conversion of hydrocarbons. Specifically, an apparatus for conversion of hydrocarbons using a reactor where heat is supplied internally using a reactor insert is described.

The invention claimed is:

1. An apparatus for hydrocarbon conversion, the apparatus comprising:
   a reactor comprising:
      an upstream end;
      a downstream end; and
      an interior cavity configured to receive a feed stream comprising a hydrocarbon at the upstream end and to discharge a product stream comprising a product at the downstream end;
   a reactor insert configured to be disposed within the interior cavity and configured to heat to at least a portion of the interior cavity to convert at least a portion of the hydrocarbon in the interior cavity into the product and produce the product stream; and
   a quench exchanger surrounding at least a portion of an exterior of the reactor, the quench exchanger configured to receive a cooling fluid and transfer heat from the product stream to the cooling fluid.

2. The apparatus of claim 1, wherein the reactor insert comprises one or more heat pipes.

3. The apparatus of claim 2, wherein the one or more heat pipes comprises:
   a working fluid;
   a wick; and
   a housing encasing the working fluid and the wick.

4. The apparatus of claim 3, wherein the working fluid comprises cesium, sodium-potassium alloy, potassium, sodium, lithium, or silver.

5. The apparatus of claim 3, wherein the wick comprises a grooved wick, capillary channels, sintered metal, a screen, a mesh, a fiber, or any combination thereof.

6. The apparatus of claim 3, wherein the housing comprises a superalloy or a refractory metal alloy.

7. The apparatus of claim 3, wherein the housing comprises nickel, chromium, niobium, or any combination thereof.

8. The apparatus of claim 2, wherein the heat pipe is configured to heat the interior cavity to a temperature from 650° C. to 1000° C.

9. The apparatus of claim 2, wherein the heat pipe is configured to provide a surface heat flux of up to 400000 W/m$^2$.

10. The apparatus of claim 1, wherein the reactor insert comprises one or more electrical resistors.

11. The apparatus of claim 10, wherein at least one of the electrical resistors is metallic.

12. The apparatus of claim 10, wherein at least one of the electrical resistors is embedded in ceramic.

13. The apparatus of claim 10, wherein at least one of the electrical resistors is embedded in ceramic with a metallic sheath.

14. The apparatus of claim 10, wherein at least one of the electrical resistors comprises nichrome, cupronickel, or any combination thereof.

15. The apparatus of claim 1, wherein the reactor insert is at least partially disposed within a curved portion of the reactor.

16. The apparatus of claim 1, wherein the more reactor insert is at least partially disposed within a straight portion of the chamber.

17. The apparatus of claim 1, wherein the reactor insert is at least partially disposed within an elbow of the reactor.

18. The apparatus of claim 1, wherein at least a portion of the reactor insert is straight.

19. The apparatus of claim 1, wherein at least a portion of the insert is curved.

20. The apparatus of claim 1, wherein the reactor insert has a surface roughness less than 100 μinch Ra.

21. The apparatus of claim 1, wherein the reactor insert has a surface roughness greater than 300 μinch Ra.

22. The apparatus of claim 1, wherein one or both of the reactor and the reactor insert has a shape of a twisted tube.

23. The apparatus of claim 1, wherein one or both of the reactor and the reactor insert has a shape of a Mixing Element Radiant Tube (MERT).

24. The apparatus of claim 1, wherein the reactor insert comprises a plurality of fins on at least a portion of an exterior surface of the reactor insert.

25. The apparatus of claim 1, wherein the reactor insert has a uniform axial profile.

26. The apparatus of claim 1, wherein the reactor insert has a non-uniform axial profile.

27. The apparatus of claim 1, wherein the reactor insert comprises a coating on at least a portion of an exterior surface of the reactor insert.

28. The apparatus of claim 27, wherein the coating comprises ceramic.

29. The apparatus of claim 1, wherein the reactor insert comprises a sheath at least partially encapsulating the reactor insert.

30. The apparatus of claim 29, wherein the sheath fully encapsulates the reactor insert.

31. The apparatus of claim 29, wherein the sheath comprises ceramic, metal, or any combination thereof.

32. The apparatus of claim 1, wherein the cooling fluid comprises boiler feedwater.

33. The apparatus of claim 1, wherein the quench exchanger is located downstream of the reactor insert in relation to an overall flow direction of the feed stream through the quench exchanger.

34. The apparatus of claim 1, wherein the quench exchanger is configured to flow the cooling fluid in a parallel-flow configuration in relation to an overall flow direction of the product stream through the quench exchanger.

35. The apparatus of claim 1, wherein the quench exchanger is configured to flow the cooling fluid in a cross-flow configuration in relation to an overall flow direction of the product stream through the quench exchanger.

36. The apparatus of claim 1, wherein the quench exchanger is configured to flow the cooling fluid in a counter-flow configuration in relation to an overall flow direction of the product stream through the quench exchanger.

37. The apparatus of claim 1, wherein the reactor insert has a coefficient of thermal expansion that is less than or equal to a coefficient of thermal expansion of the reactor.

38. The apparatus of claim 1, wherein the reactor insert has a coefficient of thermal expansion that is greater than or equal to a coefficient of thermal expansion of the reactor.

39. The apparatus of claim 1, wherein the reactor insert comprises a first end and a second end.

40. The apparatus of claim 39, wherein the first end is connected to an electrical power source.

41. The apparatus of claim 39, wherein the second end is free.

42. The apparatus of claim 39, wherein the second end is connected to the reactor.

43. The apparatus of claim 39, wherein the second end is connected to an electrical power source.

44. The apparatus of claim 1, wherein the reactor insert has a cylindrical shape.

45. The apparatus of claim 1, wherein the reactor insert comprises a hollow tube.

46. The apparatus of claim 1, wherein the reactor insert is configured to provide uniform heat generation along the length of the interior cavity of the reactor.

47. The apparatus of claim 1, wherein the reactor insert is configured to provide non-uniform heat generation along the length of the interior cavity of the reactor.

48. The apparatus of claim 1, comprising an insulating material surrounding at least a portion of an exterior of the reactor.

49. The apparatus of claim 1, wherein the reactor is housed inside a gas-fired furnace.

50. A method for hydrocarbon conversion, the method comprising:

heating an interior cavity of a reactor, the reactor comprising an upstream end and a downstream end;

introducing a feed stream comprising a hydrocarbon into the interior cavity at the upstream end;

converting in the interior cavity at least a portion of the hydrocarbon into a product;

cooling a product stream comprising the product using a quench exchanger surrounding at least a portion of an exterior of the reactor, the quench exchanger configured to receive a cooling fluid and transfer heat from the product stream to the cooling fluid; and discharging the product stream from the downstream end; wherein the interior cavity is heated by a reactor insert disposed within the interior cavity.

51. The method claim 50, wherein the reactor insert comprises an electrical resistor connected to an electrical power source and generating heat within the interior cavity of the chamber comprises providing, by the electrical power source, power to the electrical resistor and converting, by the electrical resistor, the power to heat in response to receiving the power.

52. The method of claim 50, wherein the reactor insert comprises a heat pipe and generating heat within the interior cavity of the chamber comprises providing heat to an end of the heat pipe.

53. The method of claim 50, wherein the reactor insert heats the interior cavity to a temperature of from 650° C. to 1000° C.

54. The method of claim 50, wherein the reactor insert provides a surface heat flux of up to 400,000 $W/m^2$.

55. The method of claim 52, wherein the heat pipe provides a surface heat flux from 75 $W/cm^2$ to 250 $W/cm^2$ in response to receiving heat at the end of the heat pipe.

56. The method of claim 50, wherein the feed stream has a residence time within the interior cavity from 0.02 s to 4.5 s.

57. The method of claim 50, wherein an exterior of the reactor insert operates at a temperature from 600° C. to 1100° C.

58. The method of claim 50, wherein the hydrocarbon comprises naphtha, liquefied petroleum gas, ethane, propane, butane, or any combination thereof.

59. The method of claim 50, wherein the product comprises ethylene, propylene, butene, or any combination thereof.

60. The method of claim 50, wherein the feed stream comprises water.

61. The method of claim 50, wherein the product stream is discharged from the reactor at a pressure from 15 kPag to 250 kPag.

* * * * *